(12) United States Patent
Wilkie

(10) Patent No.: US 10,323,401 B2
(45) Date of Patent: Jun. 18, 2019

(54) CURB INLET FILTER

(71) Applicant: Granite Environmental, Inc., Sebastian, FL (US)

(72) Inventor: Mark Wilkie, Sebastian, FL (US)

(73) Assignee: Granite Environmental, Inc., Sebastian, FL (US)

( * ) Notice: Subject to any disclaimer, the term of this patent is extended or adjusted under 35 U.S.C. 154(b) by 157 days.

(21) Appl. No.: 15/242,580

(22) Filed: Aug. 21, 2016

(65) Prior Publication Data

US 2017/0051491 A1 Feb. 23, 2017

Related U.S. Application Data

(60) Provisional application No. 62/208,564, filed on Aug. 21, 2015.

(51) Int. Cl.
*E03F 5/04* (2006.01)
*E02B 3/02* (2006.01)
(Continued)

(52) U.S. Cl.
CPC ........ *E03F 5/0404* (2013.01); *B01D 29/0047* (2013.01); *B01D 35/02* (2013.01); *C02F 1/001* (2013.01); *E03F 5/046* (2013.01); *B01D 2201/0415* (2013.01); *B01D 2201/40* (2013.01); *B01D 2221/12* (2013.01);
(Continued)

(58) Field of Classification Search
CPC ....... E03F 5/0404; E03F 5/046; E03F 5/0403; E03F 5/06; C02F 1/001; C02F 2103/001; E02B 3/023; B01D 29/0004; B01D 29/0018; B01D 29/0047; B01D 29/005; B01D 29/0095; B01D 29/01; B01D 29/05; B01D 29/50; B01D 35/02; B01D 39/00; B01D 39/08; B01D 39/086; B01D 2201/04; B01D 2201/0415; B01D 2201/31; B01D 2201/40; B01D 2221/12; B01D 2239/02; B01D 2239/06; B01D 2239/065; B01D 2239/0659; B01D 2239/0663; B01D 2239/0668; B01D 2239/069
USPC .............. 52/11–13; 210/155, 162, 163, 164, 210/170.03, 323.1, 483, 499, 503–509, 210/747.2, 747.3; 404/2–5; 405/127
See application file for complete search history.

(56) References Cited

U.S. PATENT DOCUMENTS 5,223,154 A * 6/1993 MacPherson, Jr. .. B01D 24/002
 210/790
5,419,838 A * 5/1995 DiTullio ................. E03B 11/14
 210/747.3
(Continued)

*Primary Examiner* — Joseph W Drodge
(74) *Attorney, Agent, or Firm* — Stephen C. Thomas

(57) ABSTRACT

A curb inlet filter adapted to work in conjunction with a curb inlet comprised of permeable filter fabric fashioned generally in a V cross section, comprising an upper and lower fabric layer separated by one or more gussets. A user inserts the curb inlet filter into a curb inlet and may apply pressure to push the filter into the curb inlet causing the gussets to compress as the invention enters the curb inlet and resulting in a press fit between the gussets supporting the upper and lower permeable filter fabric layers. The compression fit retains the inlet filter into place and the curb inlet. Water may pass through the permeable filter fabric, while the permeable filter fabric prevents sediment and other unwanted debris from entering the storm water drainage system.

11 Claims, 15 Drawing Sheets

(51) Int. Cl.
*C02F 1/00* (2006.01)
*B01D 29/00* (2006.01)
*B01D 35/02* (2006.01)
*E03F 5/046* (2006.01)
*C02F 103/00* (2006.01)

(52) U.S. Cl.
CPC ........ *B01D 2239/069* (2013.01); *C02F 1/004* (2013.01); *C02F 2103/001* (2013.01); *C02F 2303/24* (2013.01); *E03F 5/0403* (2013.01)

(56) References Cited

U.S. PATENT DOCUMENTS

| | | | | |
|---|---|---|---|---|
| 5,658,096 A * | 8/1997 | Von Kanel | .......... | E02D 29/0208 405/16 |
| 5,849,198 A * | 12/1998 | Sharpless | ................ | C02F 1/285 210/693 |
| 5,954,952 A * | 9/1999 | Strawser, Sr. | .......... | B01D 29/01 210/164 |
| 6,045,691 A * | 4/2000 | McDermott | ........... | B01D 17/00 210/164 |
| 6,379,543 B1 * | 4/2002 | Bowman | .............. | B01D 24/007 210/170.03 |
| 6,672,799 B2 * | 1/2004 | Earl | .......................... | E02B 3/04 404/6 |
| 6,692,188 B1 * | 2/2004 | Walker | .................... | E02B 3/106 405/115 |
| 6,808,623 B2 * | 10/2004 | Harris | .................. | E03F 5/0404 210/164 |
| 7,125,487 B1 * | 10/2006 | Kaufmann | ........ | B01D 19/0031 210/170.03 |
| 7,156,987 B1 * | 1/2007 | Sanguinetti | ............... | E03F 1/00 210/164 |
| 7,422,682 B2 * | 9/2008 | McPhillips | ............ | A01N 25/08 210/170.03 |
| 7,431,533 B1 * | 10/2008 | Oda | ........................ | E02B 3/104 405/107 |
| 7,491,338 B2 * | 2/2009 | Nino | ........................ | E03F 1/00 210/131 |
| 7,544,016 B2 * | 6/2009 | McGinn | ............. | B01D 21/0012 405/302.6 |
| 8,043,498 B2 * | 10/2011 | Rueda | ....................... | E03F 1/00 210/164 |
| 9,315,961 B2 * | 4/2016 | Lancaster | ............... | E02D 31/00 |
| 9,562,350 B1 * | 2/2017 | Witt | ..................... | B01D 29/012 |
| 2005/0286982 A1 * | 12/2005 | Olafsson | ................... | E01F 7/04 405/302.6 |
| 2007/0003369 A1 * | 1/2007 | Hanson | .................. | A01N 25/08 210/170.03 |
| 2008/0157044 A1 * | 7/2008 | Barfield | .................. | E02B 3/104 405/107 |
| 2009/0301953 A1 * | 12/2009 | Crumpler | .................. | E03F 1/00 210/162 |
| 2010/0320131 A1 * | 12/2010 | Singleton | ................ | C02F 1/004 210/170.03 |
| 2011/0247973 A1 * | 10/2011 | Sargand | .................. | C02F 1/288 210/232 |
| 2013/0299402 A1 * | 11/2013 | Rogahn | .................. | E03F 5/0404 210/163 |
| 2017/0051491 A1 * | 2/2017 | Wilkie | .................. | E03F 5/0404 |
| 2017/0057832 A1 * | 3/2017 | Wilkie | .................. | C02F 1/004 |
| 2017/0058504 A1 * | 3/2017 | Wilkie | .................. | C02F 1/004 |

* cited by examiner

FIGURE 8

Mirafi® 160N

Data for Comparison

Mirafi® 160N is a needlepunched nonwoven geotextile composed of polypropylene fibers, which are formed into a stable network such that the fibers retain their relative position. Mirafi® 160N is inert to biological degradation and resists naturally encountered chemicals, alkalis, and acids. Mirafi® 160N meets Aashto M288-06 Class 2 for elongation > 50%. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® 160N is provided for comparison purposes only.

| PROPERTY | TEST METHOD | ENGLISH | METRIC |
|---|---|---|---|
| Weight - Typical | ASTM D-5261 | 6.0 oz/sy | 203 g/sm |
| Tensile Strength | ASTM D-4632 | 160 lbs | 712 N |
| Elongation @ Break | ASTM D-4632 | 50% | 50% |
| CBR Puncture | ASTM D-6241 | 410 lbs | 1,825 N |
| Trapezoidal Tear | ASTM D-4533 | 60 lbs | 300 N |
| Apparent Opening Size | ASTM D-4751 | 70 US Sieve | .212 mm |
| Permittivity | ASTM D-4491 | 1.50 Sec-1 | 1.50 Sec-1 |
| Water Flow Rate | ASTM D-4491 | 110 g/min/sf | 4,481 l/min/sm |
| UV Resistance @ 500 Hours | ASTM D-4355 | 70% | 70% |

FIGURE 11

Mirafi® FW 300

Data for Comparison

Mirafi® FW 300 geotextile is composed of polypropylene yarns, which are woven into a stable network such that the yarns retain their relative position. Mirafi® FW 300 geotextile is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® FW 300 is provided for comparison purposes only.

| PROPERTY | TEST METHOD | ENGLISH | METRIC |
|---|---|---|---|
| Weight – Typical | ASTM D-5261 | 8.4 oz/sy | 285 g/sm |
| Tensile Strength | ASTM D-4632 | 400 x 335 lbs | 1,780 x 1,491 N |
| Elongation @ Break | ASTM D-4632 | 20 x 15% | 20 x 15% |
| Thickness – Typical | ASTM D-5199 | 35 mils | 0.90 mm |
| Wide Width Tensile | ASTM D-4595 | 2,760 x 2,700 lbs/ft | 40.3 x 39.4 kN/m |
| CBR Puncture | ASTM D-6241 | 1,250 lbs | 5,563 N |
| Trapezoidal Tear | ASTM D-4533 | 145 x 125 lbs | 645 x 556 N |
| Apparent Opening Size | ASTM D-4751 | 30 US Sieve | .600 mm |
| Permittivity | ASTM D-4491 | 1.50 Sec-1 | 1.50 Sec-1 |
| Permeability | ASTM D-4491 | 0.13 cm/sec | 0.13 cm/sec |
| Water Flow Rate | ASTM D-4491 | 115 g/min/sf | 4,685 l/min/sm |
| Percent Open Area | CW-02215 | 8% | 8% |
| UV Resistance @ 500 Hours | ASTM D-4355 | 90% | 90% |

FIGURE 12

Mirafi® FW 403

Data For Comparison

Mirafi® FW 403 geotextile is composed of high-tenacity monofilament polypropylene yarns, which are woven into a stable network such that the yarns retain their relative position. Mirafi® FW 403 geotextile is inert to biological degradation and resists naturally encountered chemicals, alkalis, and acids. TenCate Geosynthetics Americas is accredited by a2La (The American Association for Laboratory Accreditation) and Geosynthetic Accreditation Institute - Laboratory Accreditation Program (GAI-LAP). This data sheet for Mirafi® FW 403 is provided for comparison purposes only.

| PROPERTY | TEST METHOD | ENGLISH | METRIC |
|---|---|---|---|
| Weight - Typical | ASTM D-5261 | 8.8 oz/sy | 298 g/sm |
| Thickness - Typical | ASTM D-5199 | 20 mils | 0.50 mm |
| Tensile Strength | ASTM D-4632 | 425 x 350 lbs | 1,891 x 1,558 N |
| Elongation @ Break | ASTM D-4632 | 21 x 21% | 21 x 21% |
| Wide Width Tensile | ASTM D-4595 | 3,240 x 2,700 lbs/ft (270 x 225 lbs/in) | 47.3 x 39.4 kN/m |
| CBR Puncture | ASTM D-6241 | 1,340 lbs | 5,963 N |
| Trapezoidal Tear | ASTM D-4533 | 145 x 125 lbs | 645 x 556 N |
| Apparent Opening Size | ASTM D-4751 | 40 US Sieve | .43 mm |
| Permittivity | ASTM D-4491 | 0.96 Sec-1 | 0.96 Sec-1 |
| Permeability | ASTM D-4491 | .046 cm/sec | .046 cm/sec |
| Water Flow Rate | ASTM D-4491 | 70 g/min/sf | 2,852 l/min/sm |
| Percent Open Area | CW-02215 | 6% | 6% |
| UV Resistance @ 500 Hours | ASTM D-4355 | 90% | 90% |

FIGURE 13

Mirafi® 140NL

Data for Comparison

Mirafi® 140NL is a needlepunched nonwoven geotextile composed of polypropylene fibers, which are formed into a stable network such that the fibers retain their relative position. Mirafi® 140NL is inert to biological degradation and resists naturally encountered chemicals, alkalis, and acids. TenCate Geosynthetics Americas is accredited by a2La (The American Association for Laboratory Accreditation) and Geosynthetic Accreditation Institute – Laboratory Accreditation Program (GAI-LAP). This data sheet for Mirafi® 140NL is provided for comparison purposes only.

| PROPERTY | TEST METHOD | ENGLISH | METRIC |
|---|---|---|---|
| Weight – Typical | ASTM D-5261 | 3.5 oz/sy | 119 g/sm |
| Tensile Strength | ASTM D-4632 | 90 lbs | 401 N |
| Elongation @ Break | ASTM D-4632 | 50% | 50% |
| CBR Puncture | ASTM D-6241 | 250 lbs | 1,113 N |
| Trapezoidal Tear | ASTM D-4533 | 40 lbs | 178 N |
| Apparent Opening Size | ASTM D-4751 | 50 US Sieve | .30 mm |
| Permittivity | ASTM D-4491 | 2.00 Sec-1 | 2.00 Sec-1 |
| Water Flow Rate | ASTM D-4491 | 145 g/min/sf | 5,907 l/min/sm |
| UV Resistance @ 500 Hours | ASTM D-4355 | 70% | 70% |

FIGURE 14

Mirafi® 180N

TENCATE GEOSYNTHETICS Americas

Mirafi® 180N is a needlepunched nonwoven geotextile composed of polypropylene fibers, which are formed into a stable network such that the fibers retain their relative position. Mirafi® 180N is inert to biological degradation and resists naturally encountered chemicals, alkalis, and acids. Mirafi® 180N meets AASHTO M288-06 Class 1 for Elongation > 50%.

TenCate Geosynthetics Americas Laboratories are accredited by a2La (The American Association for Laboratory Accreditation) and Geosynthetic Accreditation Institute – Laboratory Accreditation Program (GAI-LAP), NTPEP Listed.

| Mechanical Properties | Test Method | Unit | Minimum Average Roll Value | |
|---|---|---|---|---|
| | | | MD | CD |
| Grab Tensile Strength | ASTM D4632 | lbs (N) | 205 (912) | 205 (912) |
| Grab Tensile Elongation | ASTM D4632 | % | 50 | 50 |
| Trapezoid Tear Strength | ASTM D4533 | lbs (N) | 80 (356) | 80 (356) |
| CBR Puncture Strength | ASTM D6241 | lbs (N) | 500 (2224) | |
| | | | Maximum Opening Size | |
| Apparent Opening Size (AOS) | ASTM D4751 | U.S. Sieve (mm) | 80 (0.18) | |
| | | | Minimum Roll Value | |
| Permittivity | ASTM D4491 | sec$^{-1}$ | 1.4 | |
| Flow Rate | ASTM D4491 | gal/min/ft² (l/min/m²) | 95 (3870) | |
| | | | Minimum Test Value | |
| UV Resistance (at 500 hours) | ASTM D4355 | % strength retained | 70 | |

| Physical Properties | Unit | Roll Sizes | |
|---|---|---|---|
| Roll Dimensions (width x length) | ft (m) | 12.5 x 360 (3.8 x 110) | 15 x 300 (4.57 x 91.4) |
| Roll Area | yd² (m²) | 500 (418) | |

FIGURE 15

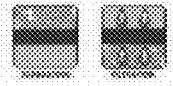

Mirafi® FW500

Mirafi® FW500 geotextile is composed of high-tenacity monofilament and slit tape polypropylene yarns, which are woven into a stable network such that the yarns retain their relative position. Mirafi® FW500 geotextile is inert to biological degradation and resists naturally encountered chemicals, alkalis, and acids.

| Mechanical Properties | Test Method | Unit | Minimum Average Roll Value | |
|---|---|---|---|---|
| | | | MD | CD |
| Wide Width Tensile Strength | ASTM D4595 | kN/m (lbs/in) | 32.1 (183) | 43.8 (250) |
| Grab Tensile Strength | ASTM D4632 | N (lbs) | 1446 (325) | 1891 (425) |
| Grab Tensile Elongation | ASTM D4632 | % | 15 | 15 |
| Trapezoid Tear Strength | ASTM D4533 | N (lbs) | 601 (135) | 668 (150) |
| CBR Puncture Strength | ASTM D6241 | N (lbs) | 4450 (1000) | |
| Apparent Opening Size (AOS)[1] | ASTM D4751 | mm (U.S. Sieve) | 0.30 (50) | |
| Percent Open Area | COE-02215 | % | 4 | |
| Permittivity | ASTM D4491 | sec$^{-1}$ | 0.51 | |
| Permeability | ASTM D4491 | cm/sec | 0.027 | |
| Flow Rate | ASTM D4491 | l/min/m² (gal/min/ft²) | 1426 (35) | |
| UV Resistance (at 500 hours) | ASTM D4355 | % strength retained | 70 | |

[1] ASTM D 4751: AOS is a Maximum Opening Diameter Value

| Physical Properties | Test Method | Unit | Typical Value |
|---|---|---|---|
| Mass/Unit Area | ASTM D5261 | g/m² (oz/yd²) | 271 (8.0) |
| Thickness | ASTM D5199 | mm (mils) | 0.9 (35) |
| Roll Dimensions (width x length) | -- | m (ft) | 3.7 (12) x 91 (300) |
| Roll Area | -- | m² (yd²) | 334 (400) |
| Estimated Roll Weight | -- | kg (lbs) | 96 (212) |

FIGURE 16

CURB INLET FILTER

CROSS REFERENCE TO RELATED APPLICATIONS AND INCORPORATION BY REFERENCE REFERENCE

This non provisional patent application claims benefit of priority to U.S. provisional patent application Ser. No. 62/208,564, titled CURB INLET FILTER, filed in the United States Patent and Trademark Office on Aug. 21, 2015, which is hereby incorporated in its entirety by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for preventing objects from being washed into drain systems such as those drain systems that provide for the egress of storm water from roadways, parking lots, and the like that may comprise curb inlets that provide a pathway for storm water to pass from, for example, a roadway, through a curb inlet, and into a drain system.

2. Background Art

Roadways, parking lots, and other similar structures generally comprise large, relatively flat exterior areas that are exposed to precipitation in any of its forms. These areas may act as collectors for precipitation in the form of rain, ice, sleet, and snow. Generally, these areas also comprise systems for collecting the precipitation and directing it into a system of fluid passageways or into a local reservoir so that the precipitation or storm water does not remain on the surface of the roadway, parking lot, or other structure. The precipitation or storm water is sometimes referred to as runoff and is typically in fluid form. In order to achieve collection of runoff so that it may be directed into a reservoir or other system, such as a storm water collection system, a system of gutters, curbs, drains and the like may be utilized.

A typical roadway surface or parking surface lot may be constructed at a slight gradient so that storm water runoff collects along one or more edges of the surface. The edge against which the water collects may terminate in a curb which may also serve to direct the water. In order for the water collected along the edge of such a surface to be directed into a storm water system, a drain is typically inserted in the curb at one or more desired positions such that storm water may egress the surface, pass through the drain, and continue to flow into the desired storm water collection system which may be a system of channels or pipes, or maybe a reservoir. Such drains or curb inlets represent an opening in the curb through which storm water must pass.

It is desirable that foreign objects or debris be prevented from passing into a storm water system. Since storm water must pass through the curb inlet as described above, such inlets represent an advantageous point at which filtration or grating may be applied in order to prevent the entry of undesirable objects, or other matter into the storm water drainage and collection system.

It is especially desirable in certain construction projects, such as, for example, housing construction, commercial construction, road construction, and any other construction that sediment and other unwanted foreign objects or material resulting from such construction activities be prevented from entering storm water systems. In the past, curb inlets have been blocked with items such as sandbags and the like, preventing the flow of water into the curb inlet. While this may prevent the entry of unwanted sediment and other foreign material from entering the storm water drainage system through a curb inlet, it also effectively prevents the curb inlet from performing its intended use, which is, namely, to act as a passageway for storm water runoff egress from, for example, a roadway under construction, into the storm water system.

Likewise, during times of extreme flooding such as may be experienced during periods of heavy rain such as may be experienced during storm events, it is desirable that storm water runoff be allowed to pass through a curb inlet into a storm water drainage system relatively unimpeded, while still preventing the passage of unwanted sediment or other foreign matter or debris into the storm water system through a curb inlet.

What is needed in the art, therefore, is an apparatus and/or method adapted to be used in conjunction with a curb inlet that prevents the entry of unwanted debris, sediment, pollutants, trash, yard waste, garbage, foreign objects or other unwanted matter from entering into a storm water drainage and collection system while still allowing fluids such as storm water runoff to pass through the curb inlet relatively unimpeded.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it is a curb inlet filter adapted to be used in conjunction with a curb inlet that operates to prevent the entry of unwanted debris, sediment, hydrocarbons, pollutants, trash, yard waste, garbage, foreign objects or other matter from entering into a storm water drainage and collection system.

In accordance with one embodiment of the present invention, the invention comprises an apparatus for filtering fluids, comprising an upper permeable fabric filter layer; a lower permeable fabric filter layer; a first side and a second side; wherein each of said first side and said second side comprise a V-shaped or U-shaped portion and wherein the upper permeable fabric filter layer and said lower permeable fabric filter layer being attached along one edge forming a attachment having a first V-shaped or U-shaped side opening and a second V-shaped or U-shaped side opening, and said first side and said second side are attached to said upper permeable fabric filter layer and said lower permeable fabric filter layer such that said the V-section or U-section of said first side is received by said first V-shaped or U-shaped side opening, and the V-section or U-sections of said second side is received by said second V-shaped or U-shaped side opening and wherein the attachment of said upper permeable fabric filter layer, said lower permeable fabric filter layer, said first side and said second side together enclose a V-shaped or U-shaped volume having an open end.

The curb filter of the present invention is adapted to be inserted into a curb inlet and to be held there in a compression fit. Storm water containing debris, sediment, foreign objects or other matter may enter the curb filter of the invention and be captured there while storm water is allowed to pass. The debris, sediment, hydrocarbons, pollutants, trash, yard waste, garbage, foreign objects or other matter may then be removed.

The present method and device of the invention overcome the shortcomings of the prior art by preventing the entry of unwanted debris, sediment, hydrocarbons, foreign objects or other unwanted matter from entering into a storm water drainage and collection system while still allowing fluids such as storm water runoff to pass through the curb inlet relatively unimpeded. The curb filter of the invention captures the unwanted debris, sediment, hydrocarbons, pollutants, trash, yard waste, garbage, foreign objects or other unwanted matter by use of permeable filter fabric that allows fluids, such as, for example, water, to pass while preventing particulate matter and unwanted debris, sediment, hydrocarbons, pollutants, trash, yard waste, garbage, foreign objects or other unwanted matter from passing.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

Figure 8:
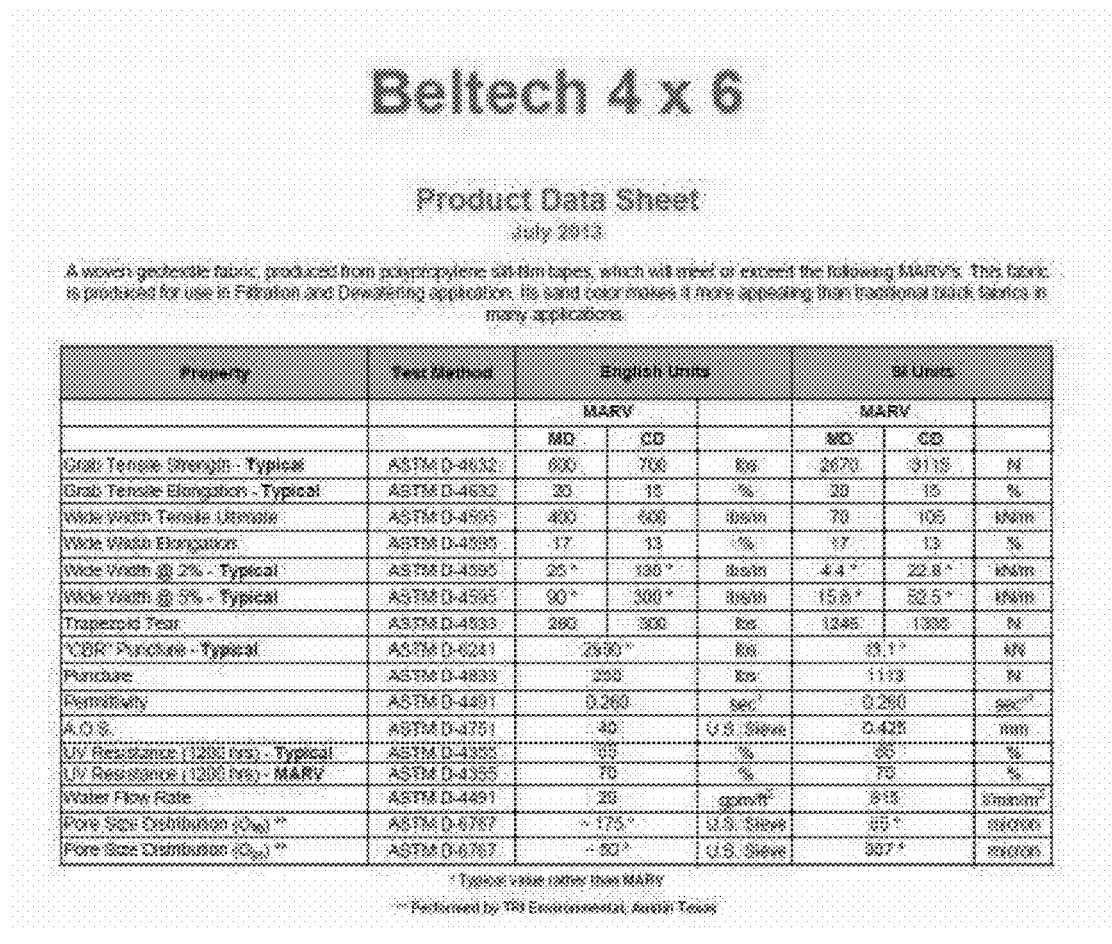

FIG. 8 depicts a data sheet showing material characteristics of Beltech 4×6 permeable filter fabric material.

FIG. 11 depicts a data sheet showing material characteristics of 160N permeable filter fabric material.

FIG. 12 depicts a data sheet showing material characteristics of FW 300 permeable filter fabric material.

FIG. 13 depicts a data sheet showing material characteristics of FW 403 permeable filter fabric material.

FIG. 14 depicts a data sheet showing material characteristics of 140 NL permeable filter fabric material.

FIG. 15 depicts a data sheet showing material characteristics of 180N permeable filter fabric material.

FIG. 16 depicts a data sheet showing material characteristics of FW500 permeable filter fabric material.

DETAILED DESCRIPTION OF THE INVENTION

Figure 1:
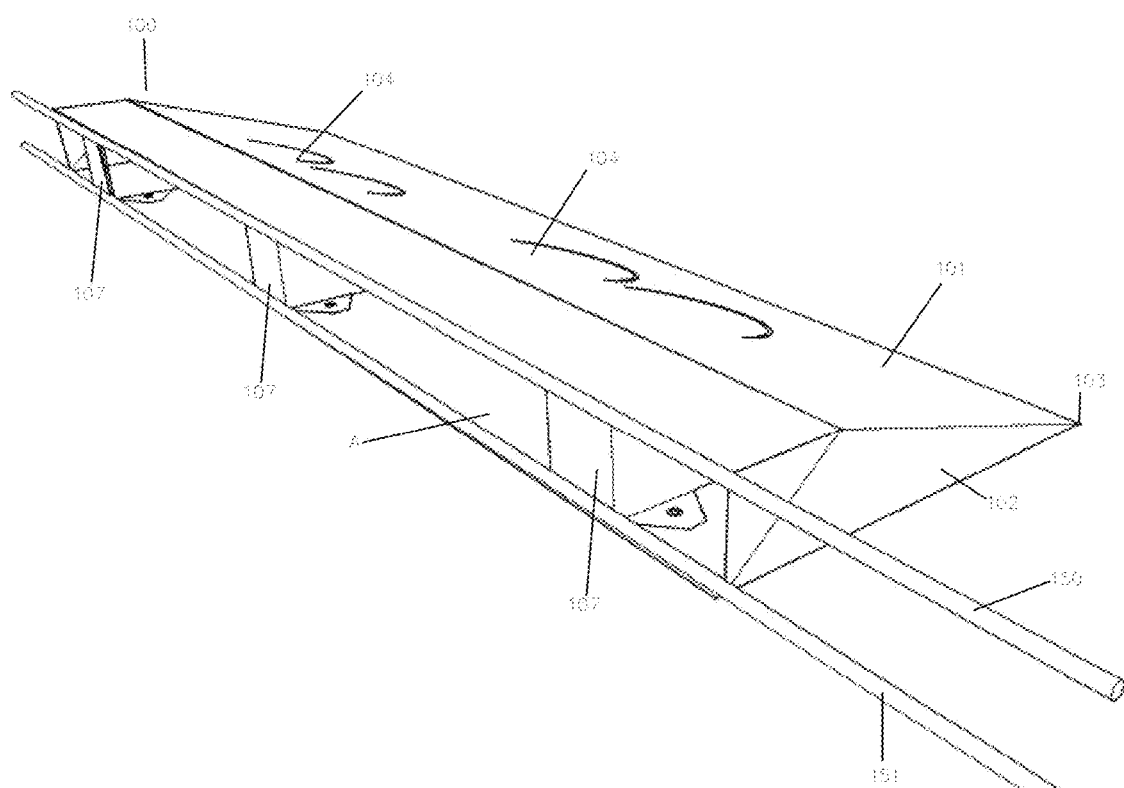
FIG. 1 depicts a perspective view of the curb filter of the invention.
Figure 2:
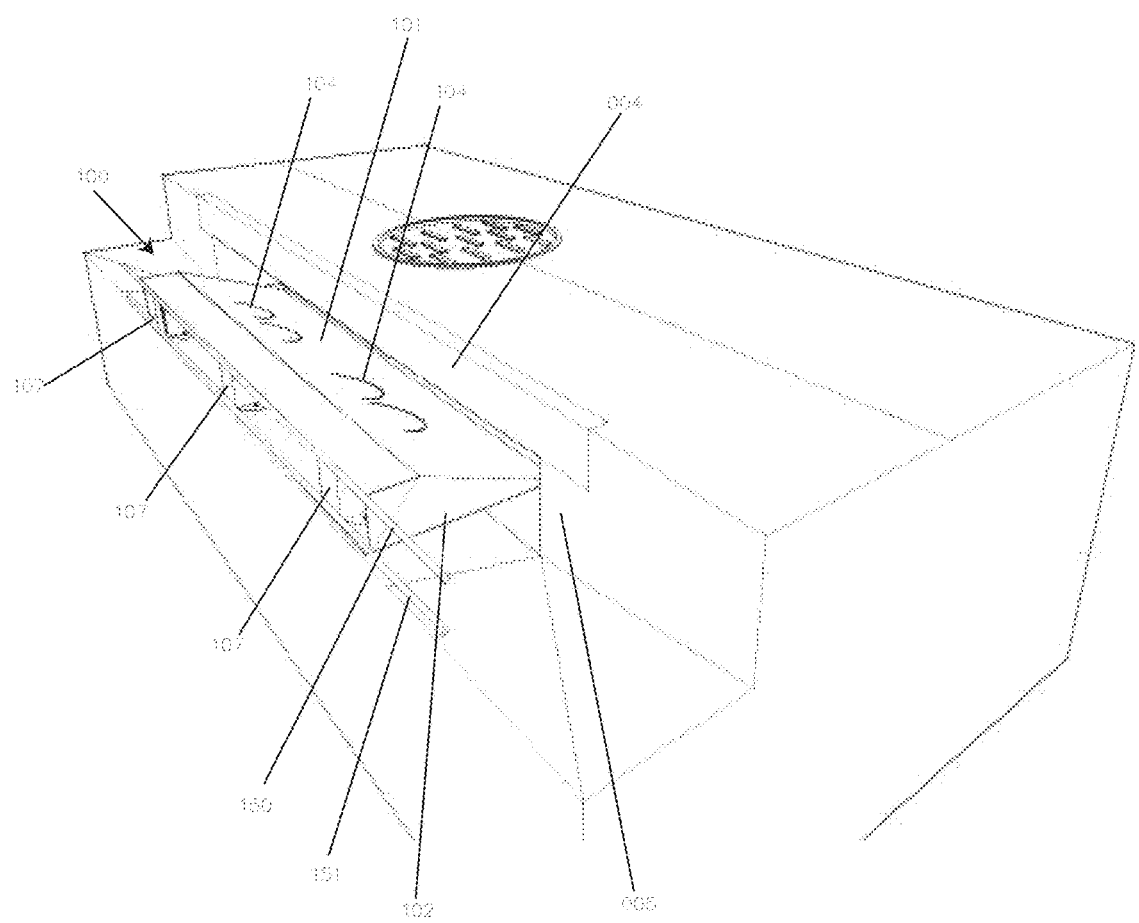
FIG. 2 depicts a perspective view of the curb filter of the invention just before the curb filter is inserted into a curb inlet.

The following documentation provides a detailed description of the invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

As referred to herein, "permeable filter fabric" means any water permeable fabric, such as, for example, a non-woven geotextile. As referred to herein, a non-woven geotextile provides water flow, including planar water flow. They are commonly known as filter fabrics, although woven monofilament geotextiles can also be referred to as filter fabrics. Typical applications for non-woven geotextiles include aggregate drains, asphalt pavement overlays and erosion control. As an example, such water permeable fabrics may be comprised of four, eight, ten, or twelve oz. per square yard non-woven geotextile material, Belton 4×6 geotextile, 140NLO geotextile, 160NO geotextile, 180NO geotextile, Filter Mat OC geotextile, FW404 geotextile, FW500 geotextile, FW300 geotextile, FW403 geotextile, LM 2199 geotextile or LM 2404 geotextile polypropylene yarn fabrics, in any combination. Data sheets for these exemplary materials are attached as FIGS. 8-16. While these materials are set forth herein as comprising the permeable filter fabric of the invention, it is within the scope of the claimed invention that any fabric may comprise the invention, and any permeable filter fabric may comprise the invention. Thus the scope of the invention is not limited to only those fabrics specifically set forth in FIGS. 8-16. Also, the curb inlet filter of the invention may comprise any one or more different permeable filter fabric materials in any combination; it is therefore not necessary that the entire curb inlet filter be comprised of a single type of permeable filter fabric material.

As used herein, V-shaped or U-shaped is utilized to refer to the cross sectional shape that the filter may take on when upper permeable filter fabric and lower permeable filter fabric are attached at 103. In the drawings, the curb inlet filter cross sectional shape is shown in an exemplary V-shaped embodiment. However, it is within the scope of the invention as described and claimed herein that the cross sectional shape of the filter may be V-shaped, U-shaped, rectangular or any other cross sectional shape. The scope of the invention is not be construed as limited to a V-shaped filter cross section only.

Referring now to FIGS. 1-7, an exemplary embodiment of the curb inlet filter of the invention is depicted in a perspective view. The curb inlet filter comprises an upper permeable filter fabric portion 101 attached to a lower permeable filter fabric portion 102 at seam 103. Upper permeable filter fabric portion 101 and lower permeable filter fabric portion 102 may be attached at seam 103 by any means known in the art such as, for example, stitching, heat welding, ultrasonic welding, chemical bonding or any other means known in the art. Upper permeable fabric filter layer 101 and said lower permeable fabric filter layer 102 may be attached along one edge 103 forming a V-shaped or U-shaped attachment having a first V-shaped or U-shaped side opening and a second V-shaped or U-shaped side opening. The curb filter of the invention may also comprise a first side and second side. The first side and the second side are attached to said upper permeable fabric filter layer and said lower permeable fabric filter layer such that said the V-section of said first side is received by said first V-shaped or U-shaped side opening, and said the V-section of said second side is received by said second V-shaped or U-shaped side opening. The attachment of the upper permeable fabric filter layer 101, the lower permeable fabric filter layer 102, the first side and the second side together enclose a V-shaped or U-shaped volume having an open end which may be any shape but which may be rectangular.

Figure 7:
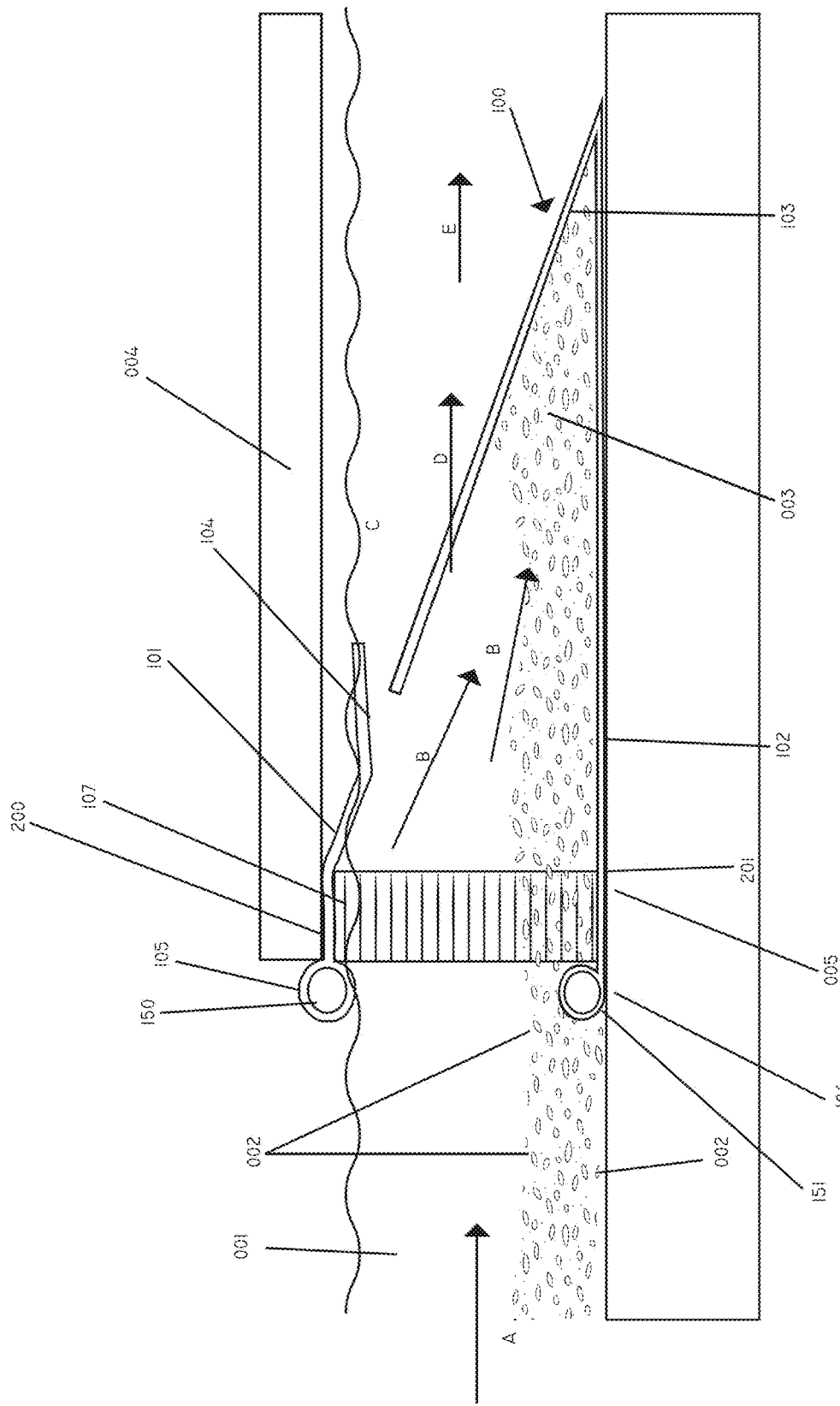
FIG. 7 depicts a cross sectional view of a curb filter of the invention inserted into a curb drain, and further depicting water flow A containing unwanted sediment or other particulate matter 002 entering the curb filter of the invention and being filtered such that substantially sediment-free storm water exits the curb filter of the invention in the direction of flow E, and depicting the curb filter of the invention held in place by compression fit between one or more gussets 107 pressed into compression against upper and lower surfaces of a curb inlet at areas 200 and 201.
Figure 9:
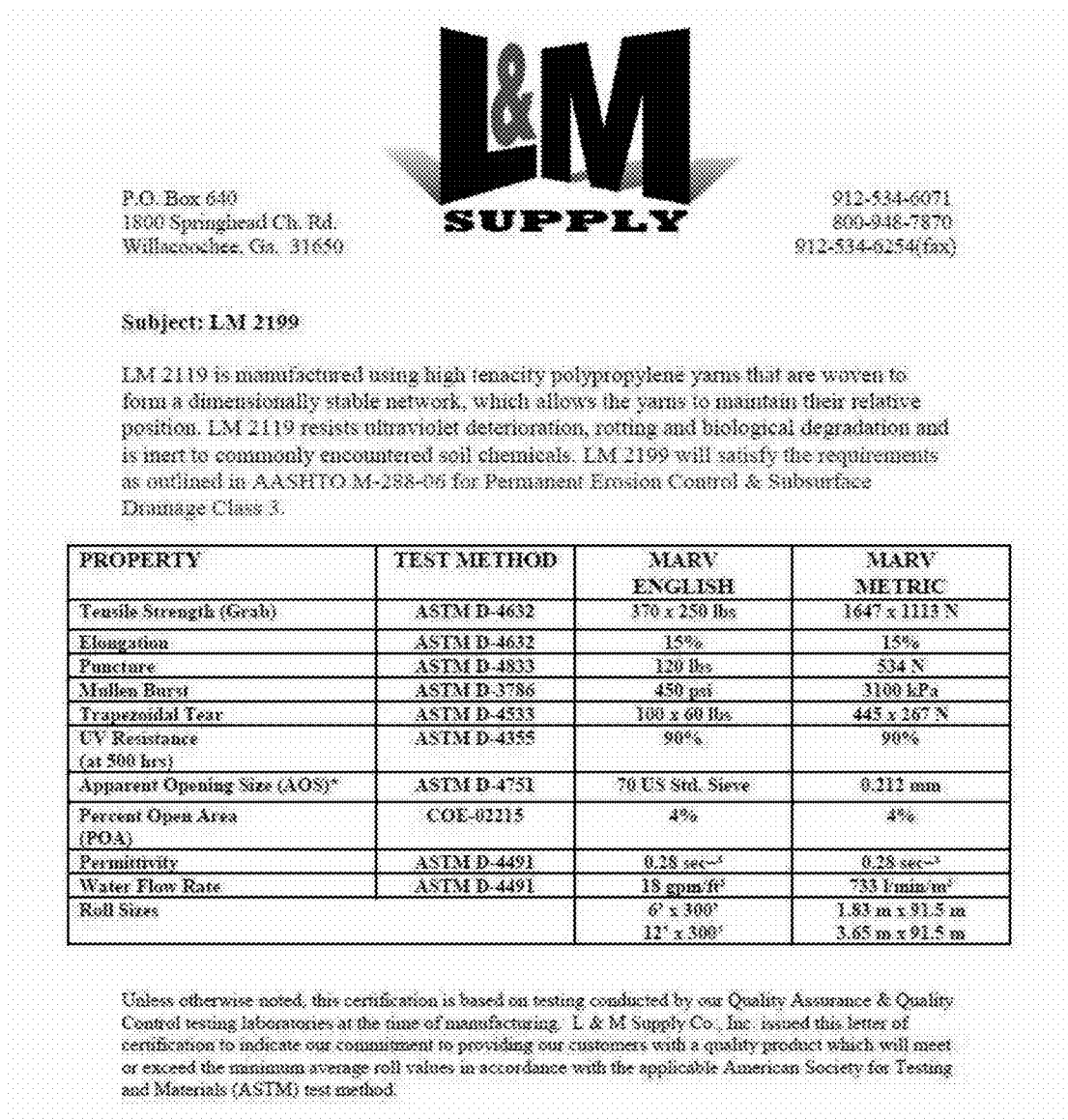
FIG. 9 depicts a data sheet showing material characteristics of LM 2199 permeable filter fabric material.
Figure 10:
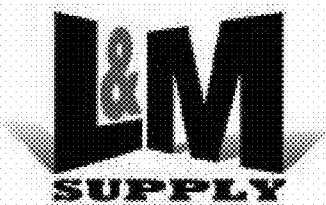
FIG. 10 depicts a data sheet showing material characteristics of LM 2404 permeable filter fabric material.

Still referring to FIGS. 1-7, the curb inlet filter opening allows the ingress of storm water in the direction of arrow A into the open end of the curb inlet filter, allowing water to flow through the filter fabric and also through openings 104 while retaining unwanted sediment debris and other material in the lower portion of the curb inlet filter 003 as depicted in FIG. 7. The curb inlet filter may further comprise an upper retaining rod pocket disposed along an upper edge of said rectangular opening, and a lower retaining rod pocket disposed along a lower edge of said rectangular opening, wherein said upper retaining rod pocket and said lower retaining rod pocket are each adapted to receive a retaining rod; thus the upper retaining rod pocket may contain retaining rod 150 and lower retaining rod pocket may also contain a retaining rod 151. Retaining rod or rods 150 and 151 may be fabricated from any material that is stiff enough to allow the ingress of Storm water into the curb inlet filter in the direction of arrow a without significant deflection of the retaining rod. Thus, for example and not by way of limitation, retaining rod or rods 150 and 151 may be fabricated from rebar steel or any other rod material available for example on a construction site. Upper permeable filter fabric 101 may further comprise one or more openings 104 to allow for flow of water there through. Openings 104 may be disposed toward the upper side of upper permeable filter fabric 101 as depicted, or may be disposed at any other location in the filter fabric. However, it is desirable that openings 104 disposed toward the upper area so as to allow the curb inlet filter to retain particulates and sediment matter in the lower portion of the curb inlet filter without such matter flowing through openings 104. This is depicted most clearly in FIG. 7.

Still referring to FIGS. 1-7, one or more gussets 107 may be disposed between upper permeable filter fabric 101 and lower permeable filter fabric 102 is depicted in the figures. The one or more gussets act as a wedge for anchoring the curb inlet filter 100 of the invention securely in place in a curb inlet opening. One or more gussets 107 also enable the device to remain in a condition to accept water flow and debris to be filtered within the curb inlet filter 100, and they also function as a velocity reducing baffle to diminish parallel water flow into and through the curb inlet filter 100, increasing the available time for sediment and debris to settle and to be captured in the lower volume of the filter 003 as is depicted in FIG. 7. One or more gussets 107 are adapted to be received by the opening of a curb inlet in a compression fit wherein said at least one gusset may be held in compression by inner surfaces 200 and 201 of the curb inlet, thereby retaining the curb inlet filter 100 of the invention in the opening of a curb inlet by means of a compression fit. One or more gussets 107 also operate to keep the inlet of the curb inlet filter of the invention 100 in an open position by holding upper permeable filter fabric 101 and lower permeable filter fabric 102 apart as depicted in the drawings.

Figure 3:
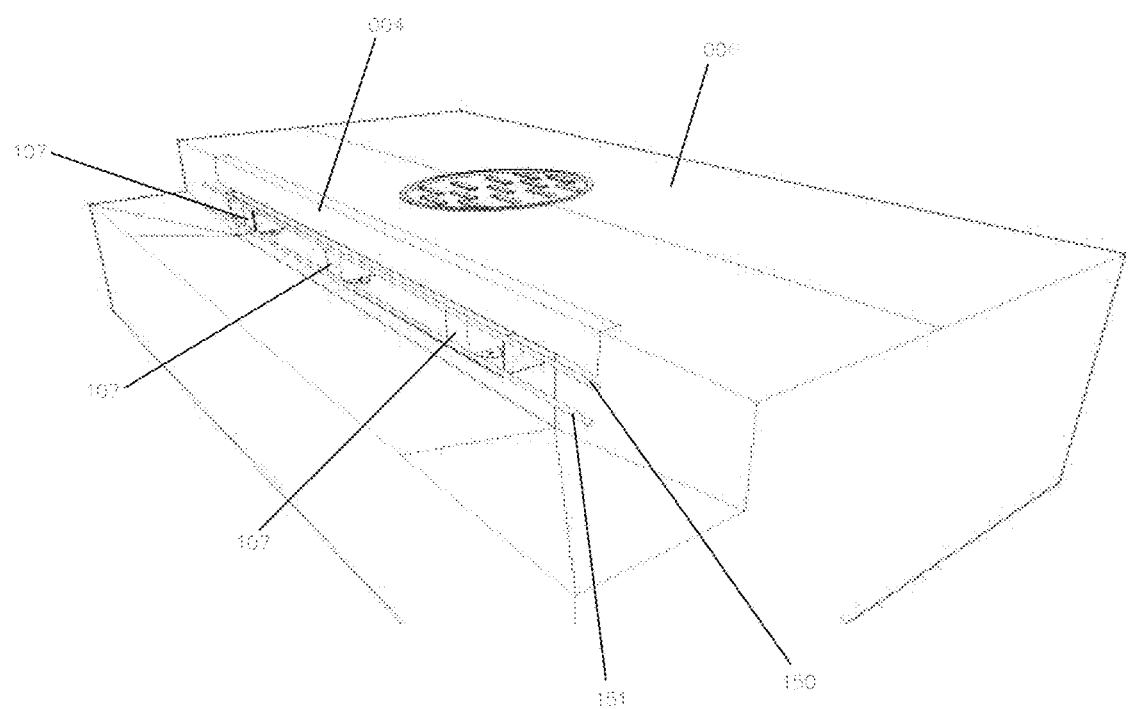
FIG. 3 depicts a perspective view of the curb filter of the invention after it has been inserted into a curb inlet.
Figure 4:
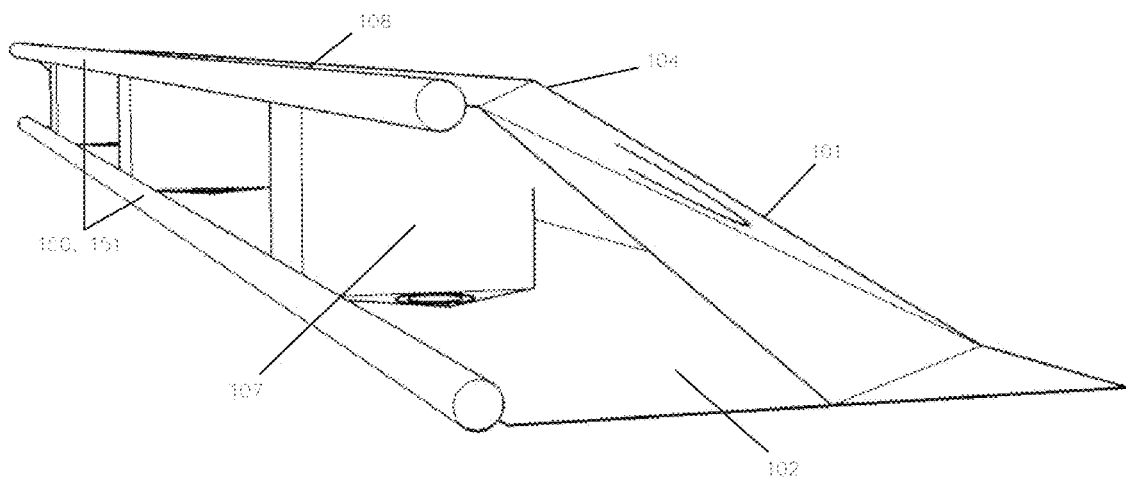
FIG. 4 depicts a perspective view from the front and side of the curb filter of the invention.
Figure 5:
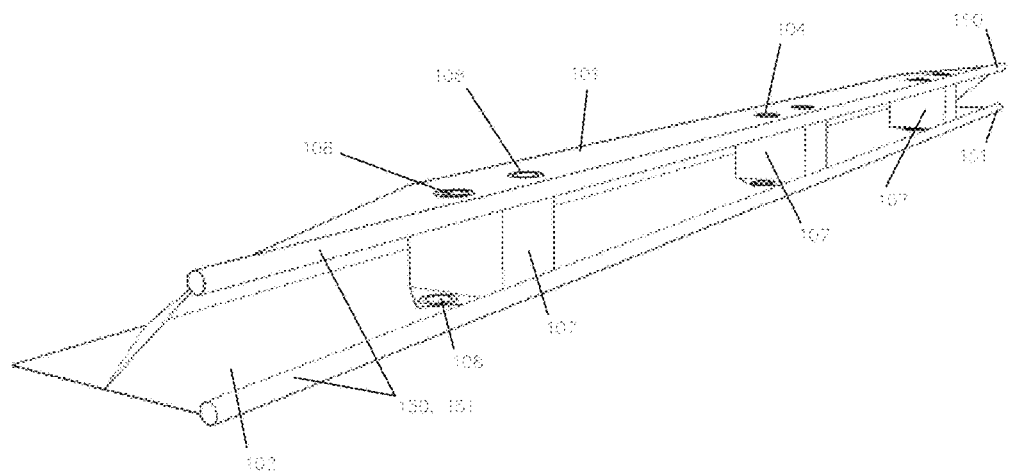
FIG. 5 depicts a perspective view from the front and side of the curb filter of the invention.
Figure 6:
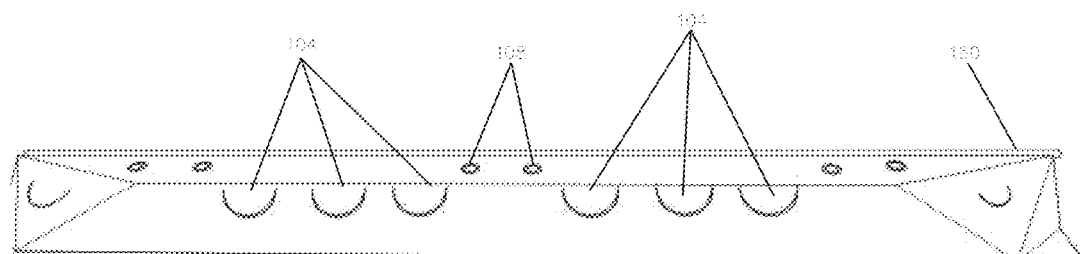
FIG. 6 depicts a perspective view from the rear side of the curb filter of the invention.

Still referring to FIGS. 1-7, retaining rods 150 and 151 may extend beyond the opening of the curb inlet filter of the invention 100 and may operate to prevent the curb inlet filter 100 from being sucked into the curb inlet by making physical contact with a front surface of the curb inlet as depicted in FIG. 3. It can be seen from FIG. 3 that retaining rods 100 and 151 may come into physical contact with a front surface of the curb inlet, preventing the curb inlet filter 100 from being sucked into the curb inlet when storm water or other fluids rush into and through the curb inlet filter.

Still referring to FIGS. 1-7, at least one, but preferably a plurality, of fasteners 108 operate to hold gussets 107 in place against upper permeable filter fabric 101 and lower permeable filter fabric 102. Fasteners 108 may be any fasteners known in the art for attaching fabrics, including permeable filter fabrics, together.

Referring now to FIG. 7, a cross section view of the curb inlet filter 100 of the invention is depicted inserted into a curb inlet, and also depicted is storm water containing sediment, debris, or other unwanted matter 002 entering curb inlet filter 100 in the direction of arrow A. As the storm water enters the curb inlet filter from the direction of arrow A it impacts the lower inner surface of upper permeable filter fabric layer 101 and is directed downward in the direction of arrows B towards the collection area 003 of curb inlet filter 100 formed by the attachment of upper permeable filter fabric 101 and lower permeable filter fabric 102 at joint 103, causing the collection of unwanted sediment, debris and other matter 003 in the collection area of curb inlet filter 100. Filtered storm water continues to pass through curb inlet filter 100 by passing through permeable filter fabric 101 as depicted by arrow D and also by passing through opening 104 as depicted by arrow C. The filtered storm water exiting the curb inlet filter and passing through the curb inlet into, for example, a storm water drainage system does so in the direction of arrow E and is free from unwanted sediment, debris, particulates or other matter. In this manner, the curb inlet filter 100 of the invention filters unwanted matter from storm water and retains it in the V section of the filter where it may be removed at a later time, while allowing the filtered storm water to pass through the curb inlet and into the storm water drainage system. Gussets 107 operate to retain the curb inlet filter 100 between an upper portion of the curb inlet 004 and a lower portion of the curb inlet 005 by means of a compression fit between gusset 107 and surfaces 200 and 201. The curb inlet filter 100 is further assisted in being retained in the curb inlet opening by operation of retaining rods 150 and 151, which may be disposed within retaining rod loops attached to the permeable filter fabric of invention. Specifically, retaining rod loop 105 may be attached to upper permeable filter fabric 101 and may contain retaining rod 150 disposed within it, and likewise retaining rod loop 106 may be attached to the lower permeable filter fabric 102 and may contain retaining rod 151. In this manner, retaining rods 150 and 151, along with gussets 107 and a compressive fit between surfaces 200 and 201, operate to retain curb inlet filter 100 and the opening of a curb inlet, and to also keep the inlet of the curb inlet filter in an open position by operation of gussets 107.

In an alternate embodiment the invention may further comprise additional filter media for the purpose of filtering specific unwanted materials such as hydrocarbons or some sediments. Such additional filter media may comprise absorbent or adsorbent pads or logs, flocculents, hydrophobic or oil-phylic materials, activated carbon, and/or polymers and may be disposed within the partially enclosed volume of curb inlet filter 100 by any means known in the art. For example, such additional filter media may be disposed in pouches sewn onto an interior surface of the curb inlet filter permeable filter fabric. Additionally, flocculent pouches may be sewn onto an interior surface of the curb inlet filter permeable filter fabric.

What is claimed is:

1. An apparatus for filtering fluids, comprising:
an upper permeable fabric filter layer;
a lower permeable fabric filter layer;
a first side and a second side, wherein each of said first side and said second side comprise a V-shaped or U-shaped portion;
wherein:
said upper permeable fabric filter layer and said lower permeable fabric filter layer being attached along one edge forming a V-shaped or U-shaped attachment having a first V-shaped or U-shaped side opening and a second V-shaped or U-shaped side opening, and said first side and said second side are attached to said upper permeable fabric filter layer and said lower permeable fabric filter layer such that said V-shaped or U-shaped portion of said first side is received by said first V-shaped or U-shaped side opening, and said V-shaped or U-shaped portion of said second side is received by said second V-shaped or U-shaped side opening;
wherein the attachment of said upper permeable fabric filter layer, said lower permeable fabric filter layer, said first side and said second side together enclose a V-shaped or U-shaped volume having an open end;
wherein said V-shaped or U-shaped volume comprises a rectangular opening; and wherein said rectangular opening is held open by at least one gusset, said at least one gusset attached to a surface of lower permeable fabric filter layer and a surface of upper permeable fabric filter layer.

2. The apparatus for filtering fluids of claim 1, wherein said at least one gusset comprises a compressible material, and wherein said rectangular opening and said at least one gusset are adapted to be received by an opening of a curb inlet in a compression fit wherein said at least one gusset is held in compression by inner surfaces of the curb inlet.

3. The apparatus for filtering fluids of claim 1 or 2 wherein said upper permeable filter fabric and lower permeable filter fabric are further defined to be selected from the group consisting of four, eight, ten, or twelve oz. non-woven geotextile fabrics.

4. The apparatus of claim 3 further comprising at least one opening in said upper permeable fabric filter layer.

5. The apparatus of claim 2 further comprising at least one opening in said upper permeable fabric filter layer.

6. The apparatus of claim 1 further comprising at least one opening in said upper permeable fabric filter layer.

7. An apparatus for filtering fluids, comprising:
an upper permeable fabric filter layer;
a lower permeable fabric filter layer;
a first side and a second side, wherein each of said first side and said second side comprise a V-shaped or U-shaped portion;
wherein:
said upper permeable fabric filter layer and said lower permeable fabric filter layer being attached along one edge forming a V-shaped or U-shaped attachment having a first V-shaped or U-shaped side opening and a second V-shaped or U-shaped side opening, and said first side and said second side are attached to said upper permeable fabric filter layer and said lower permeable fabric filter layer such that said V-shaped or U-shaped portion of said first side is received by said first V-shaped or U-shaped side opening, and said V-shaped or U-shaped portion of said second side is received by said second V-shaped or U-shaped side opening;
wherein the attachment of said upper permeable fabric filter layer, said lower permeable fabric filter layer, said first side and said second side together enclose a V-shaped or U-shaped volume having an open end; and
wherein said V-shaped or U-shaped volume comprises a rectangular opening; and further comprising an upper retaining rod pocket disposed along an upper edge of said rectangular opening, and a lower retaining rod pocket disposed along a lower edge of said rectangular opening, wherein said upper retaining rod pocket and said lower retaining rod pocket are each adapted to receive a retaining rod.

8. The apparatus for filtering fluids of claim 7, further comprising an upper retaining rod inserted into said upper retaining rod pocket, and a lower retaining rod inserted into said lower retaining rod pocket, and wherein said upper retaining rod and said lower retaining rod are of sufficient length to extend beyond said curb inlet opening on both ends.

9. The apparatus of claim 8 further comprising at least one opening in said upper permeable fabric filter layer.

10. The apparatus of claim 7 further comprising at least one opening in said upper permeable fabric filter layer.

11. A method for filtering matter from a fluid, comprising the steps of:
providing a filter comprising:
an upper permeable fabric filter layer;
a lower permeable fabric filter layer;
a first side and a second side, wherein each of said first side and said second side comprise a V-shaped or U-shaped portion;
wherein:
said upper permeable fabric filter layer and said lower permeable fabric filter layer being attached along one edge forming a V-shaped or U-shaped attachment having a first V-shaped or U-shaped side opening and a second V-shaped or U-shaped side opening, and said first side and said second side are attached to said upper permeable fabric filter layer and said lower permeable fabric filter layer such that said V-shaped portion or U-shaped portion of said first side is received by said first V-shaped or U-shaped side opening, and said V-shaped portion or said U-shaped portion of said second side is received by said second V-shaped or U-shaped side opening;
wherein the attachment of said upper permeable fabric filter layer, said lower permeable fabric filter layer, said first side and said second side together enclose a V-shaped or U-shaped volume having an open end; and wherein at least one gusset comprises a compressible material, and wherein said rectangular opening and said at least one gusset are adapted to be received by the opening of a curb inlet in a compression fit wherein said at least one gusset is held in compression by inner surfaces of the curb inlet, said at least one gusset attached to a surface of lower permeable fabric filter layer and a surface of upper permeable fabric filter layer;

inserting said filter into an opening of a curb inlet such that said gussets are in a compression fit between surfaces of the curb inlet;

passing a fluid containing matter through into said curb inlet through said filter;

and retaining said matter in said filter while allowing said fluid to pass through the permeable filter fabric comprising said filter.

\* \* \* \* \*